(12) United States Patent
Griffin et al.

(10) Patent No.: US 8,126,521 B2
(45) Date of Patent: Feb. 28, 2012

(54) MULTI-MODE USER INPUT SYSTEM AND METHOD

(75) Inventors: Jason Griffin, Waterloo (CA); Julia Allwright, London (GB); Martin Riddiford, London (GB)

(73) Assignee: Research In Motion Limited, Waterloo, Ontario (CA)

( * ) Notice: Subject to any disclaimer, the term of this patent is extended or adjusted under 35 U.S.C. 154(b) by 443 days.

(21) Appl. No.: 12/394,238

(22) Filed: Feb. 27, 2009

(65) Prior Publication Data

US 2010/0222115 A1   Sep. 2, 2010

(51) Int. Cl.
*H05K 7/20* (2006.01)

(52) U.S. Cl. ................. 455/575.4; 455/575.3; 455/575.8

(58) Field of Classification Search ............... 455/575.1, 455/575.3, 575.4, 575.8; 379/433.01, 433.11–433.13
See application file for complete search history.

(56) References Cited

U.S. PATENT DOCUMENTS

| | | | |
|---|---|---|---|
| 7,209,772 B2 * | 4/2007 | Crisp | 455/575.4 |
| 7,599,723 B2 * | 10/2009 | Lee et al. | 455/575.4 |
| 2005/0009581 A1 | 1/2005 | Im et al. | |
| 2007/0032278 A1 * | 2/2007 | Lee et al. | 455/575.4 |
| 2007/0091582 A1 | 4/2007 | Ku et al. | |
| 2007/0097607 A1 * | 5/2007 | Lee | 361/679 |
| 2008/0015002 A1 * | 1/2008 | Crisp | 455/575.4 |
| 2008/0058034 A1 | 3/2008 | Lu et al. | |
| 2009/0015996 A1 | 1/2009 | Chang et al. | |
| 2009/0168339 A1 * | 7/2009 | Lee | 361/679.56 |
| 2009/0233660 A1 * | 9/2009 | Demuynck | 455/575.4 |

FOREIGN PATENT DOCUMENTS

| | | |
|---|---|---|
| EP | 1 793 568 A | 6/2007 |
| EP | 1 858 234 A | 11/2007 |
| EP | 1 944 951 A | 7/2008 |
| GB | 2 387 062 A | 10/2003 |
| WO | 2006006776 A1 | 1/2006 |

OTHER PUBLICATIONS

Nokia N95, Nokia Corporation, Product described at, for example, http://en.wikipedia.org/wiki/Nokia_N95.
Samsung's SGH-F520, Product described at, for example, http://gizmodo.com/gadgets/cellphones/samsung-sghf520-cellphone-slides-up-and-down-side-to-side-rubiks-and-iphone-clone-235788.php, Feb. 12, 2007.
Samsung F400, Product described at, for example, http://www.mobile-phones-uk.org.uk/samsung-f400.htm, Jul. 2008.

(Continued)

*Primary Examiner* — Vibol Tan
(74) *Attorney, Agent, or Firm* — Hanley, Flight & Zimmerman, LLC.

(57) ABSTRACT

A system and method for multi-mode user input for a mobile device, the system including: a second portion of the mobile device; a first portion of the mobile device that is movably engaged with the second portion to move between a closed position and an open position to allow access to an open user input area; and a detent mechanism configured to allow the first portion to be held at a first mode position between the closed position and the open position to allow access to a partial user input area that is less than the open user input area. The partial user input area has predetermined functions associated therewith, which may be changed when the first portion is moved to an open position, exposing the open user input area.

18 Claims, 16 Drawing Sheets

OTHER PUBLICATIONS

Pantech PN810, Product described at, for example, http://www.itechnews.net/tag/helio-pantech-pn-810/, Feb. 25, 2007.

Corrected Extended European Search Report for corresponding European Application No. 10155105.9 dated Jun. 9, 2010.

Extended European Search Report for corresponding European Application No. 10155105.9 dated Jun. 9, 2010.

European Patent Office, Examination Report issued in European application 09154021.1, dated Sep. 20, 2011, 4 pages.

European Patent Office, Extended European Search Report issued in EP application 09154021.1, dated Jul. 24, 2009, 7 pages.

\* cited by examiner

MULTI-MODE USER INPUT SYSTEM AND METHOD

FIELD

This application relates to a user input system and method and, in particular, to a multi-mode user input system and method.

BACKGROUND

Mobile communication devices are in use throughout everyday life. One common aspect of the design and development of mobile communication devices is that there is an ongoing movement to reduce the size of devices and to provide increased functionality even though the size is being reduced.

Conventional attempts to provide additional functionality in a smaller package have resulted in mobile communication devices that are described as a "flip phone" in which a hinge is provided and the mobile communication device opens in a clam shell fashion to reveal additional functions on both parts of the flipped device. Another conventional method to add functionality has been the use of a slider function in which the face or a portion of the mobile communication device is slid along a base of the mobile communication device to reveal, for example, a keyboard or the like. More recently, some conventional devices have the capability of sliding the face or first portion in either of two directions to provide additional access to certain functionality. For example, sliding the cover in one direction may reveal a keyboard while in another direction may reveal telephone keys.

These existing solutions present certain problems with regard to the user accessing functions. For example, with the flip phone concept, the user must entirely open the phone to access the functions. Further, with the slider phone concept, the user must open the phone fully to access the functionality and in the situation of two directional sliding, the user may not be able to access both levels of functionality at the same time.

As such there is a need for an improved user input system and method for mobile communication devices.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

DETAILED DESCRIPTION

Figure 1:
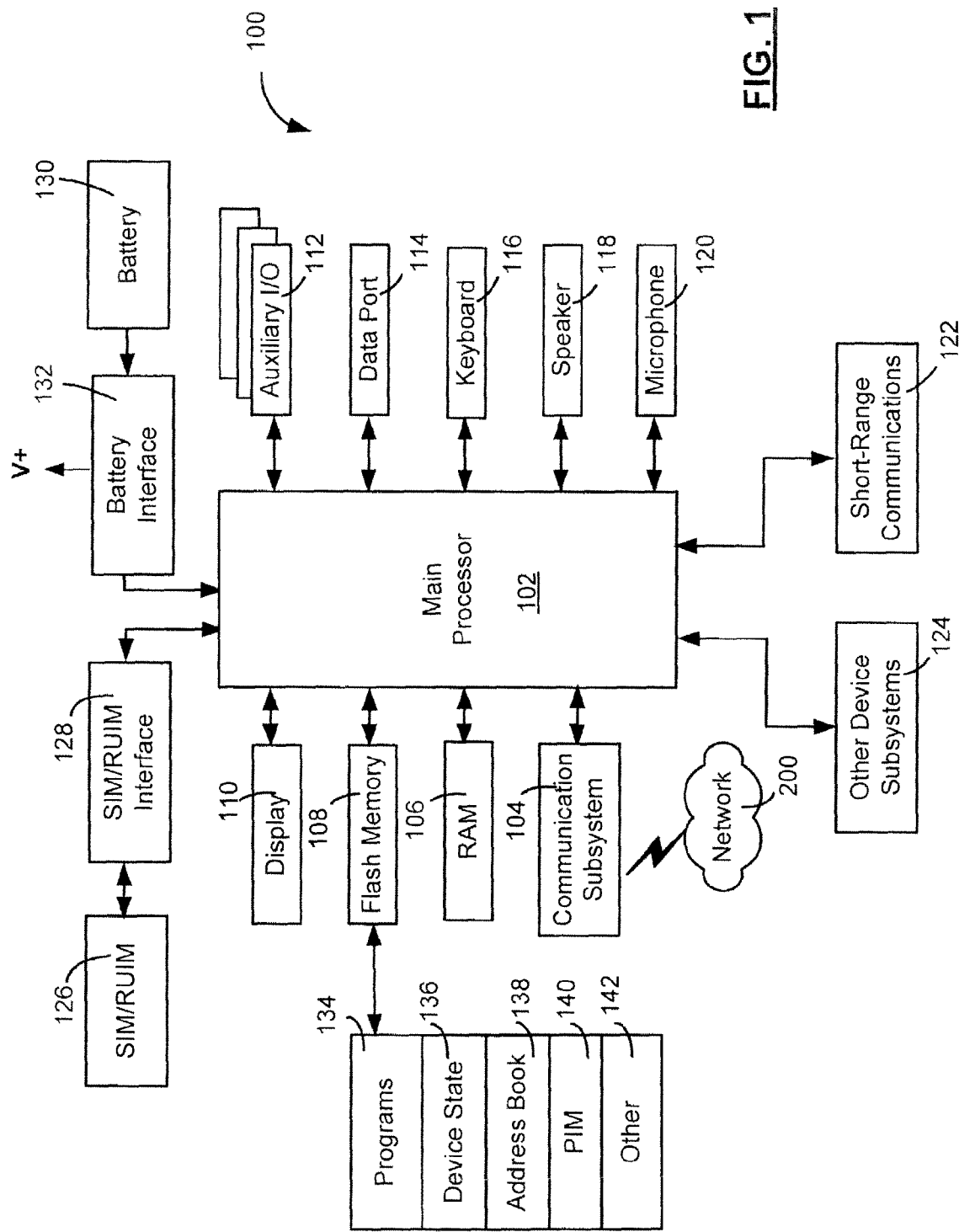
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

According to an aspect herein, there is provided a system for multi-mode user input for a mobile device including: a first portion of the mobile device; a second portion of the mobile device that is movably engaged with the first portion to allow the first portion to move between a closed position and an open position to allow access to an open user input area; and a detent mechanism configured to allow the first portion to be held at a first mode position between the closed position and the open position to allow access to a partial user input area that is less than the open user input area.

In a particular case, the first portion may be movably engaged with the second portion in a slidable manner.

In another particular case, the detent mechanism may include: a lower magnetically active element provided to the second portion; and an upper magnetically active element provided to the first portion that is configured to align with the lower magnetically active element when the first portion is at the first mode position.

In this case, the lower magnetically active element may be a steel plate. Alternatively, the upper and lower magnetically active elements may be magnets, each having a different polarity. In the case of magnets, the upper magnet and lower magnet may have a different magnetic strength. Further, at least one of the magnets may comprise a magnet having a steel surround or, alternatively, a magnet having a steel cover.

In another case, the system may further include: a second upper magnetically active element provided to the first portion that is configured to align with the lower magnetically active element when the first portion is at the closed position. Alternatively or in addition, the system may further include: a third upper magnetically active element provided to the first portion that is configured to align with the lower magnetically active element when the first portion is at the open position.

In yet another case, the detent mechanism may include: a cam provided to the second portion; and a movable pivot provided to the first portion that is configured to engage with the cam such that the first portion is held with a predetermined force when the first portion is at the first mode position.

In still yet another case, the first portion may be slidably engaged with the second portion by a sliding mechanism including: a rail provided in the second portion; and a bridge element provided between the second portion and the first portion that supports the first portion and is engaged with the rail to allow sliding movement of the bridge element along the rail.

In a further case, the first portion may be slidably engaged with the second portion by a sliding mechanism including: a rail provided in the second portion; and an engagement element provided to the first portion that engages with the rail to allow sliding movement of the first portion along the rail.

In some embodiments, the partial user input area provides media play/record functions and the open user input area provides keyboard functions.

According to another aspect herein, there is provided a method for multi-mode user input for a mobile device including: when the mobile device is in a closed position, applying a force to a first portion of the mobile device in relation to a second portion of the mobile device to open the mobile device; providing a detent mechanism configured to allow the first portion to be held at a first mode position in which a first user input area is available; and from the first mode position, applying a further force to move the first portion to a second mode position in which a second user input area is available without moving through the closed position.

In a particular case, the method may further include changing the function of the first user input area when moving to the second mode position. In this case, the changing the function of the first user input area include changing a function of at least one input control within the first user input area.

According to another aspect herein, there is provided a method for multi-mode user input for a mobile device including: providing a mobile device having a second portion and a first portion that is movably engaged with the second portion to move between a closed position and an open position to allow access to an open user input area; and providing a detent mechanism configured to allow the first portion to be held at an intermediate position between the closed position and the open position to allow access to a partial user input area that is less than the open user input area.

In a particular case, the method may further include changing the function of the partial user input area when moving between the intermediate mode position and the open position.

Some of the embodiments make use of a mobile communication device, sometimes referred to herein as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a user input system 116, such as a keyboard, a speaker 118, a microphone 120, short-range communications 122, and other device subsystems 124.

Some of the subsystems of the mobile device 100 perform communication-related functions, whereas other subsystems can provide "resident" or on-device functions. By way of example, the display 110 and the user input system 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The programs 134 can include an email program, a web browser, an attachment viewer, and the like.

The mobile device 100 further includes a device state module 136, an address book 138, a Personal Information Manager (PIM) 140, and other modules 142. The device state module 136 can provide persistence, i.e. the device state module 136 ensures that important device data is stored in persistent memory, such as the flash memory 108, so that the data is not lost when the mobile device 100 is turned off or loses power. The address book 138 can provide information for a list of contacts for the user. For a given contact in the address book, the information can include the name, phone number, work address and email address of the contact, among other information. The other modules 142 can include a configuration module (not shown) as well as other modules that can be used in conjunction with the SIM/RUIM interface 128.

The PIM 140 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscribers corresponding data items stored and/or associated with a host computer system. This functionality creates a mirrored host computer on the mobile device 100 with respect to such items. This can be particularly advantageous when the host computer system is the mobile device subscribers office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and other mobile devices, computer systems or accessory devices, without the use of the wireless network 200. For example, the subsystem 122 can include a wireless transmitter/receiver and associated circuits and components for short-range communication. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices. The establishment of short-range communications is described in greater detail below.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the user input system 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The user input system 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
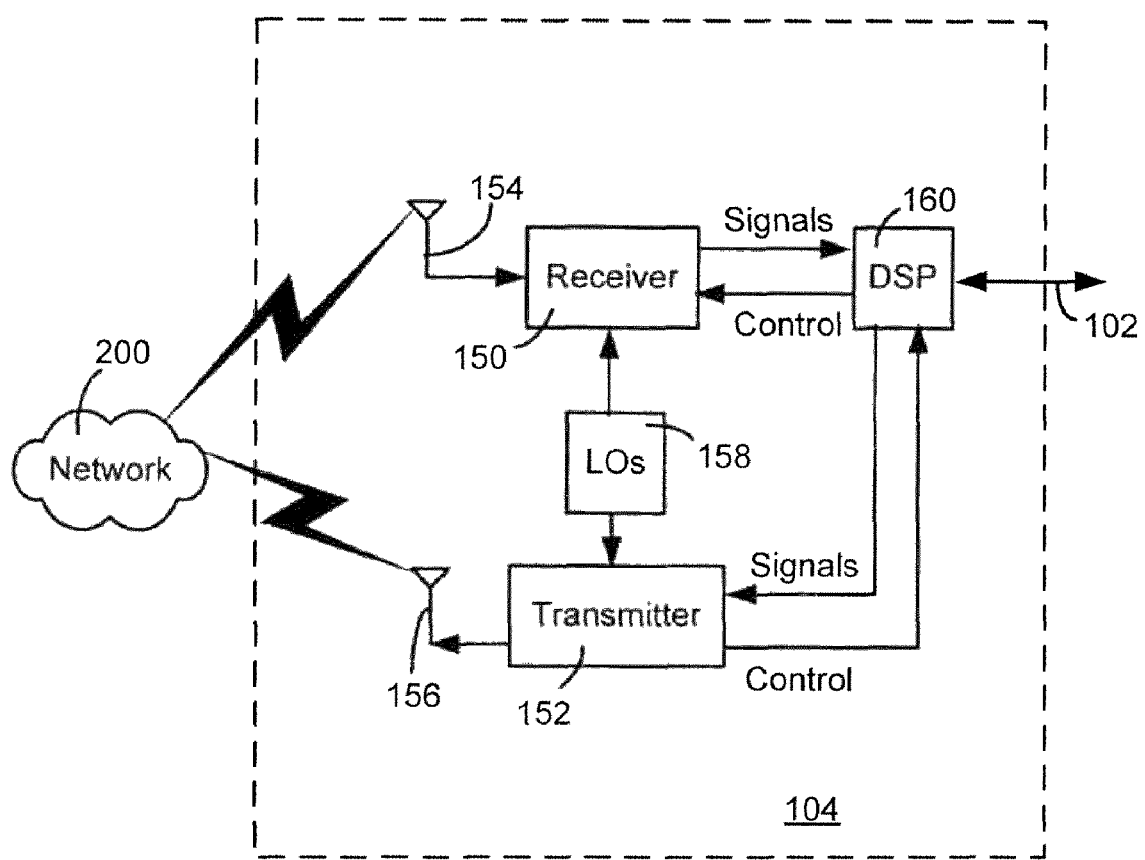
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gain/attenuation applied to communication signals in the receiver 150 and transmitter 152 can be adaptively controlled through automatic gain/attenuation control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
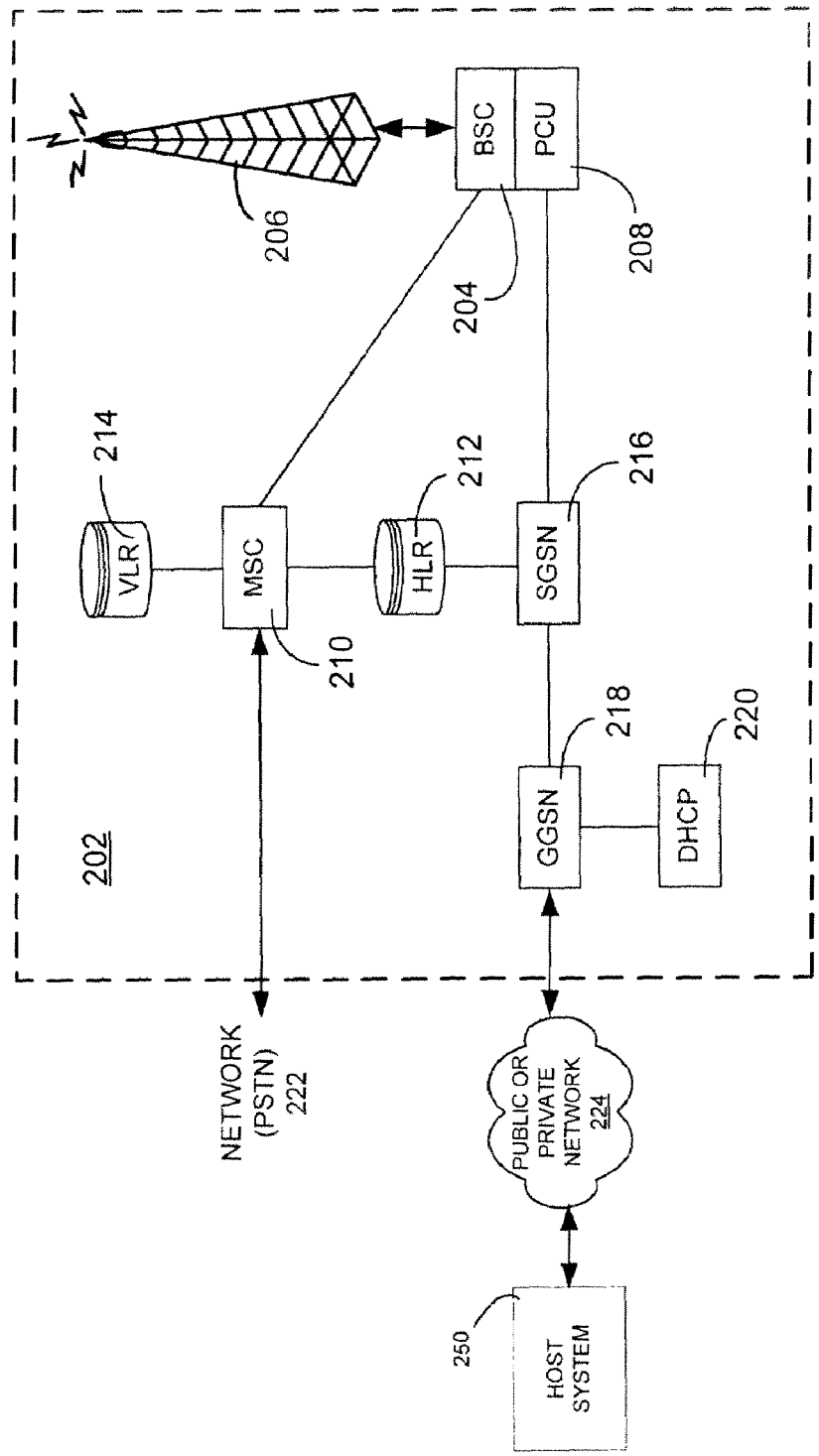

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Using the above described general mobile device environment as an exemplary environment for communications, the following description relates to user input systems and methods that can be applied to the mobile device described above. Generally speaking, the user input system makes use of an in-line dual mode sliding feature to allow a user to access some functions when a first portion of the mobile device is slid to a first position and additional functions when the first portion is slid in the same direction to a second position.

Figure 4A:
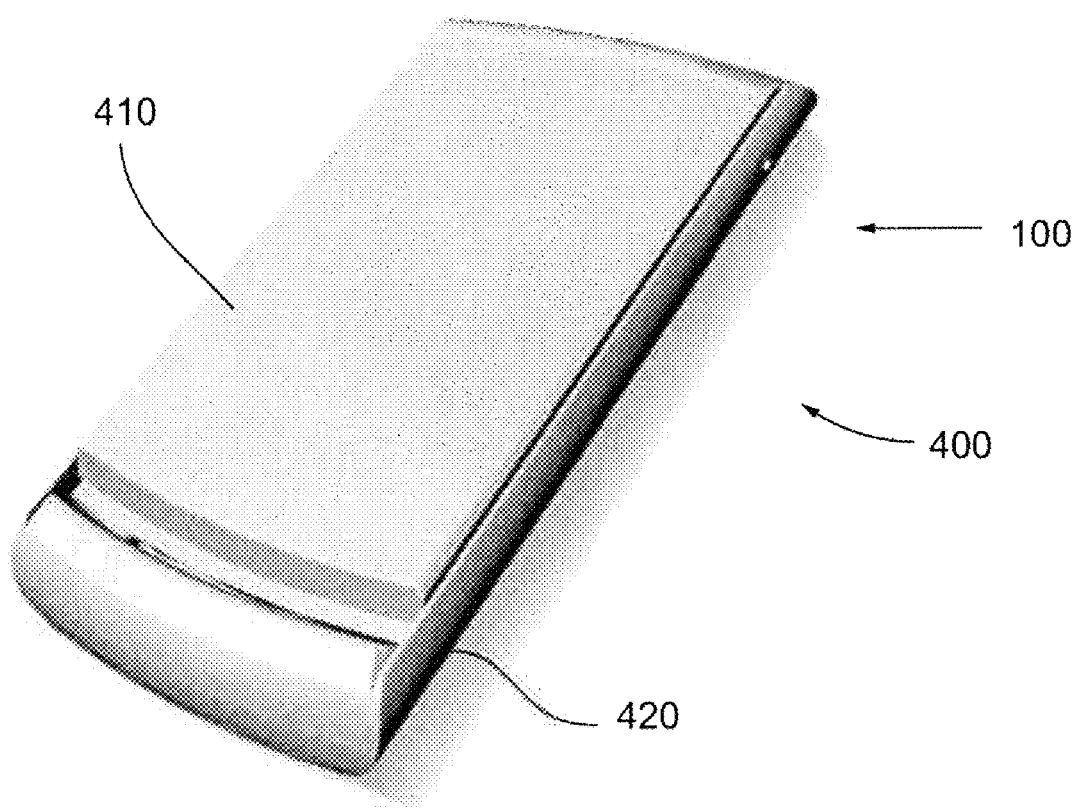
FIG. 4A to 4C illustrate an example embodiment of a multi-mode user input system.
Figure 4B:
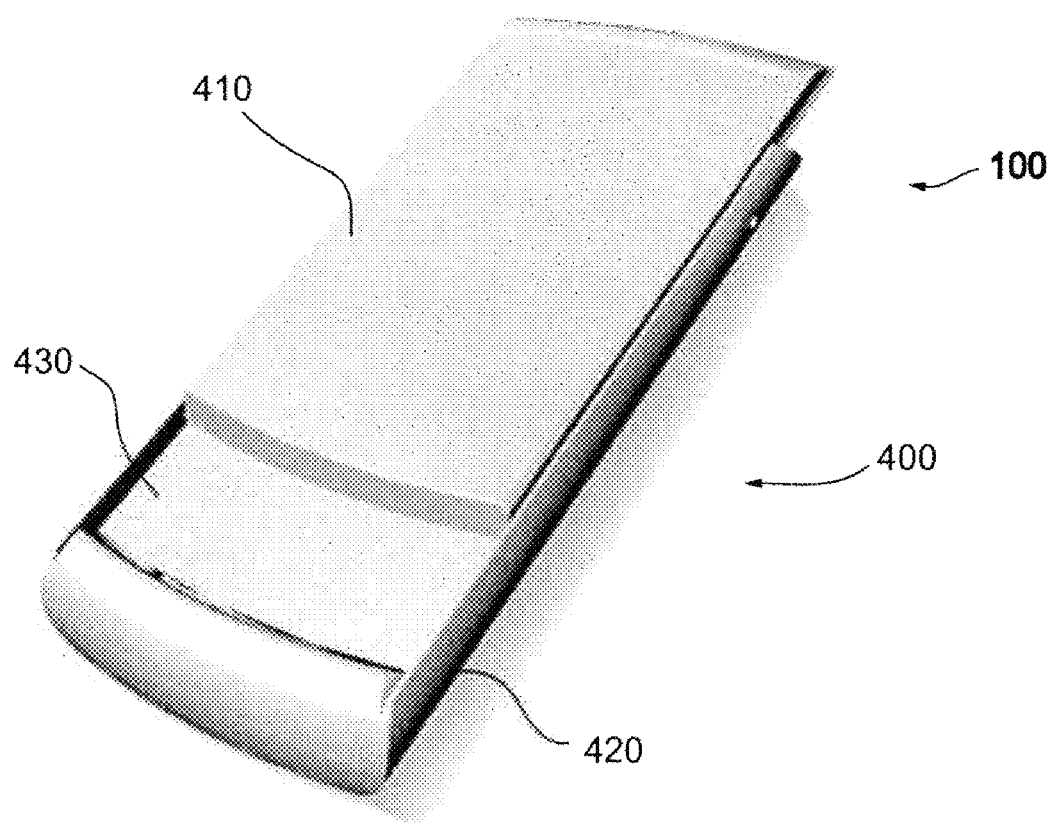
Figure 4C:
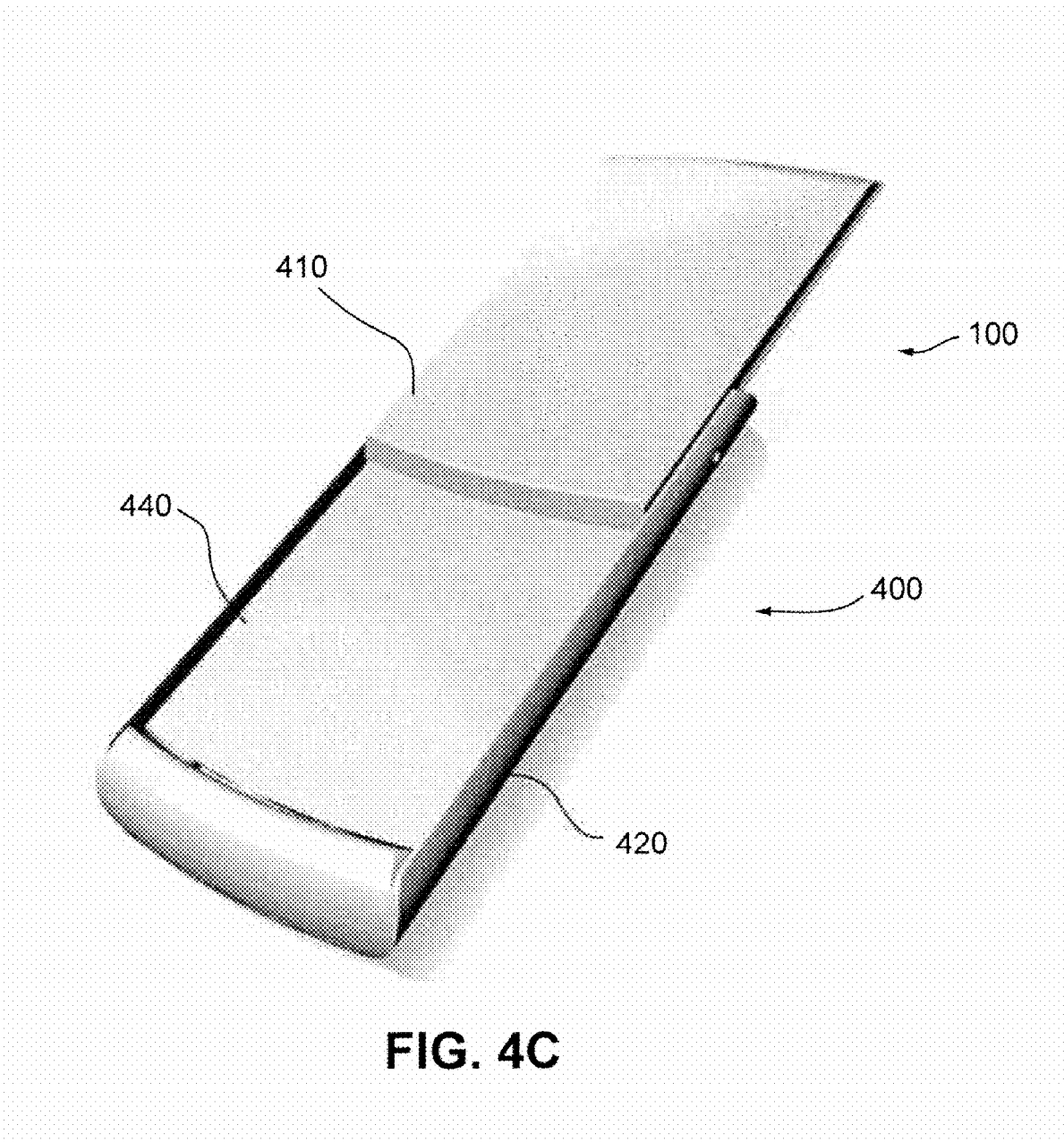

FIG. 4A to 4C illustrate an example embodiment of a multi-mode user input system 400. In FIG. 4A, the mobile device 100 is in a closed position in which a first portion 410 of the mobile device 100 is positioned generally overtop of a second portion 420. In FIG. 4B, the mobile device 100 is in a first mode position in which the first portion 410 of the mobile device 100 has been moved (in this embodiment by sliding) relative to the second portion 420 of the mobile device 100. In the first mode position, the user may have access to a first user input area 430 (sometimes referred to as a partial user input area) providing some predetermined level of functionality, such as, for example, a plurality of input controls such as multimedia keys (not shown) each having a function to, for example, allow the playing, rewinding, recording or the like of music or media content. In FIG. 4C, the mobile device 100 is in a second mode position in which the first portion 410 has been moved relative to the second portion 420 in the same direction. The user now has access to a second user input area 440 (sometimes referred to as an open user input area). The second user input area 440 may provide both the first mode functionality and additional second mode functionality for user input. For example, the user may now be able to access a larger number of input controls, such as a keyboard layout like a telephone or QWERTY key set.

It will be understood that in some embodiments, the first and second user input areas 430/440 may include physical keys. In other embodiments, the first and second user input areas 430/440 may involve a touch screen that may provide an image of keys to the user. In either case, the assigned functionality of the first mode user input area and the second mode user input area may be adjusted such that the user input(s) available in the first mode may have their functionality reassigned or adjusted based on a move by the user of the mobile device to the second mode. With physical keys, this may be achieved by having multiple functions assigned to (and, in some cases, visible on) each key.

This use of an in-line multi-mode sliding system 400 provides the advantages that the user of the mobile device 100 does not need to fully open the mobile device 100 to access certain types of functionality. Further, if the user is using the first mode of functionality, there is no need to transition through a closed position to access the additional functionality of the second mode of the input system. Still further, if the user only opens to the first mode or if the use moves to the first mode from the second mode, the mobile device 100 may be configured to automatically (or provide a prompt asking if to) change applications to an application associated with the first mode. This allows the move to the first mode to act as a shortcut key to automatically perform a function. The user benefits from easier access to an application such as, for example, a music player, in the first mode position, while using another application such as, for example, e-mail, in the second mode position. A return to the second mode position can then return the user to the e-mail application.

Figure 5:
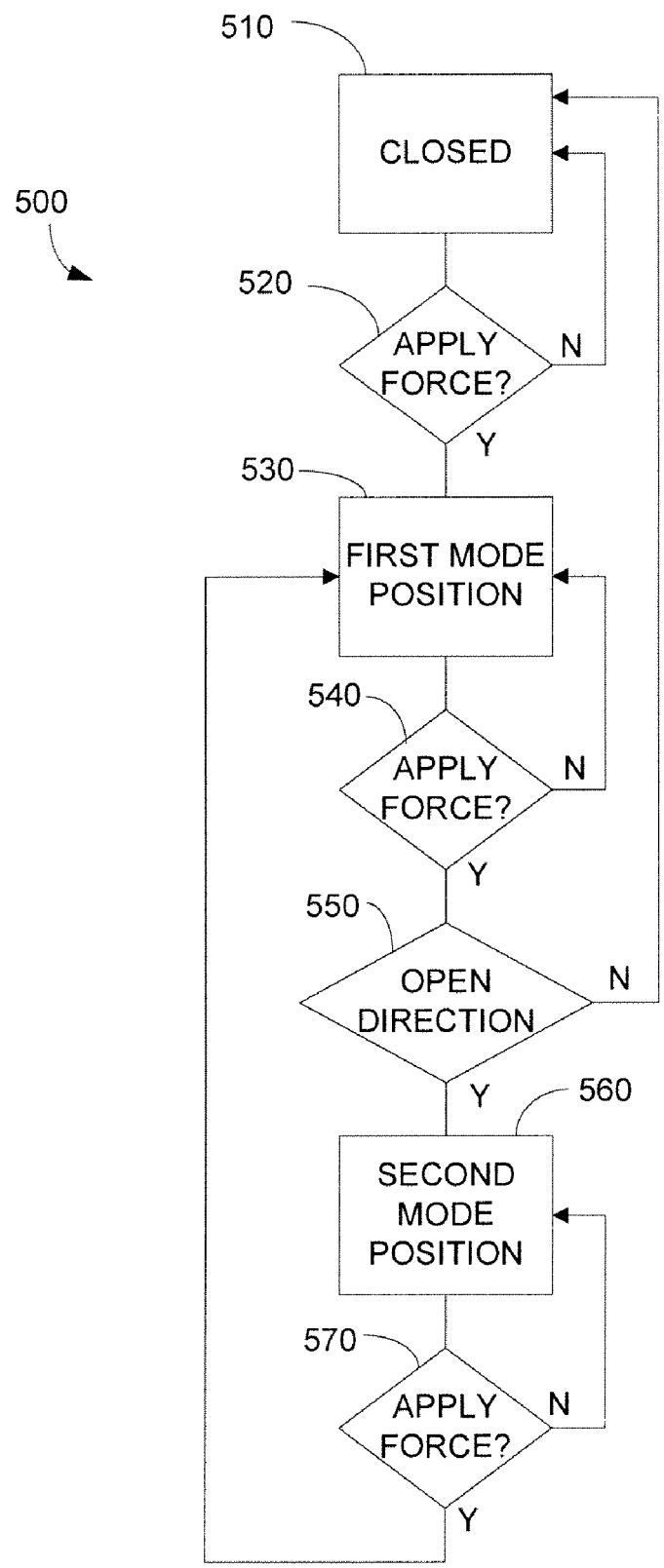
FIG. 5 shows a flowchart of a multi-mode user input method according to an exemplary embodiment.

FIG. 5 shows a flowchart of an example embodiment of a multi-mode user input method 500. In this method 500, the mobile device 100 starts in a closed position (510). The user then typically applies a force (520) to slide a first portion 410 of the mobile device 100 a predetermined distance to a first mode position, at which point a locking/detent mechanism (described herein) engages to maintain the first portion 410 in positional relation to the second portion 420 of the mobile device 100 (520). By exerting additional force (540), the user is able to overcome the locking/detent mechanism to allow the user to move the first portion 410 in relation to the second portion 420. If the force is in the opening direction, the first portion 410 is moved in relation to the second portion 420 a second predetermined distance to a second mode position (560) At the second predetermined distance, an open locking/detent mechanism engages to maintain the first portion 410 in positional relation to the second portion 420. The user is then able to apply additional force (570) to overcome the open locking/detent mechanism to return the first portion 410 to the first mode position (520) or, via further force, to the closed position (510).

Having outlined the general approach to an in-line multi-mode user input system and method above, it will be understood that there are various slider mechanisms and locking/detent mechanisms that may be used to implement the user input system and method. The following description and figures provide various example implementations but it should be understood that these examples are not intended to be limiting.

Figure 6:
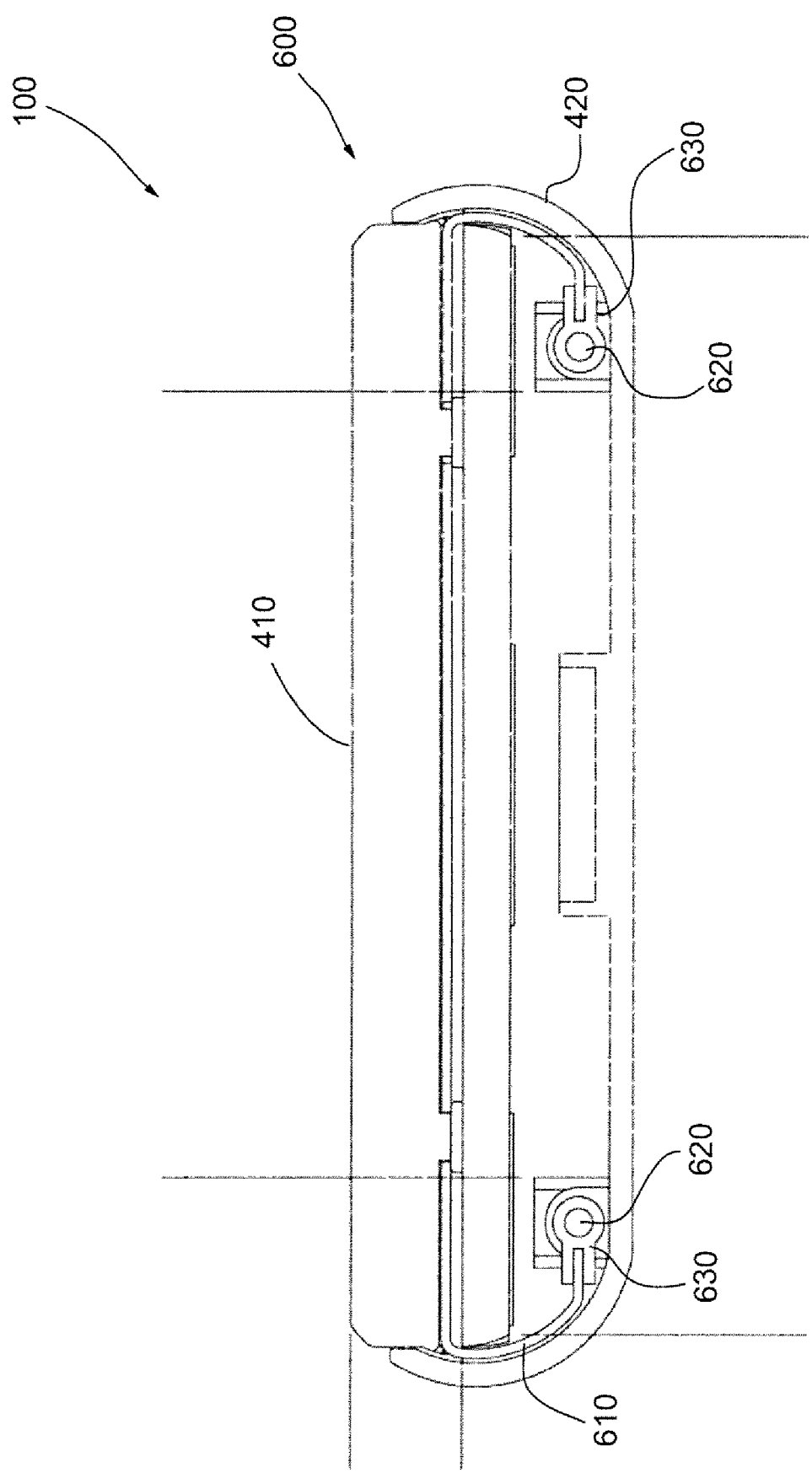
FIG. 6 shows a schematic diagram of an example sliding mechanism for a mobile device.

FIG. 6 shows a schematic diagram of an example embodiment of a sliding mechanism 600 for a mobile device 100. In this embodiment, a first portion 410 of the mobile device 100 is mounted on a bridge element 610 that is then supported on a rail or rails 620 that are provided in the second portion 420 of the mobile device 100. In this particular embodiment, the sliding mechanism 600 includes clips 630 that engage the bridge element 610 to the rails 620. The first portion 410 may be slidably moved relative to the second portion 420 by movement of the bridge element 610 along the rails 620.

Figure 7:
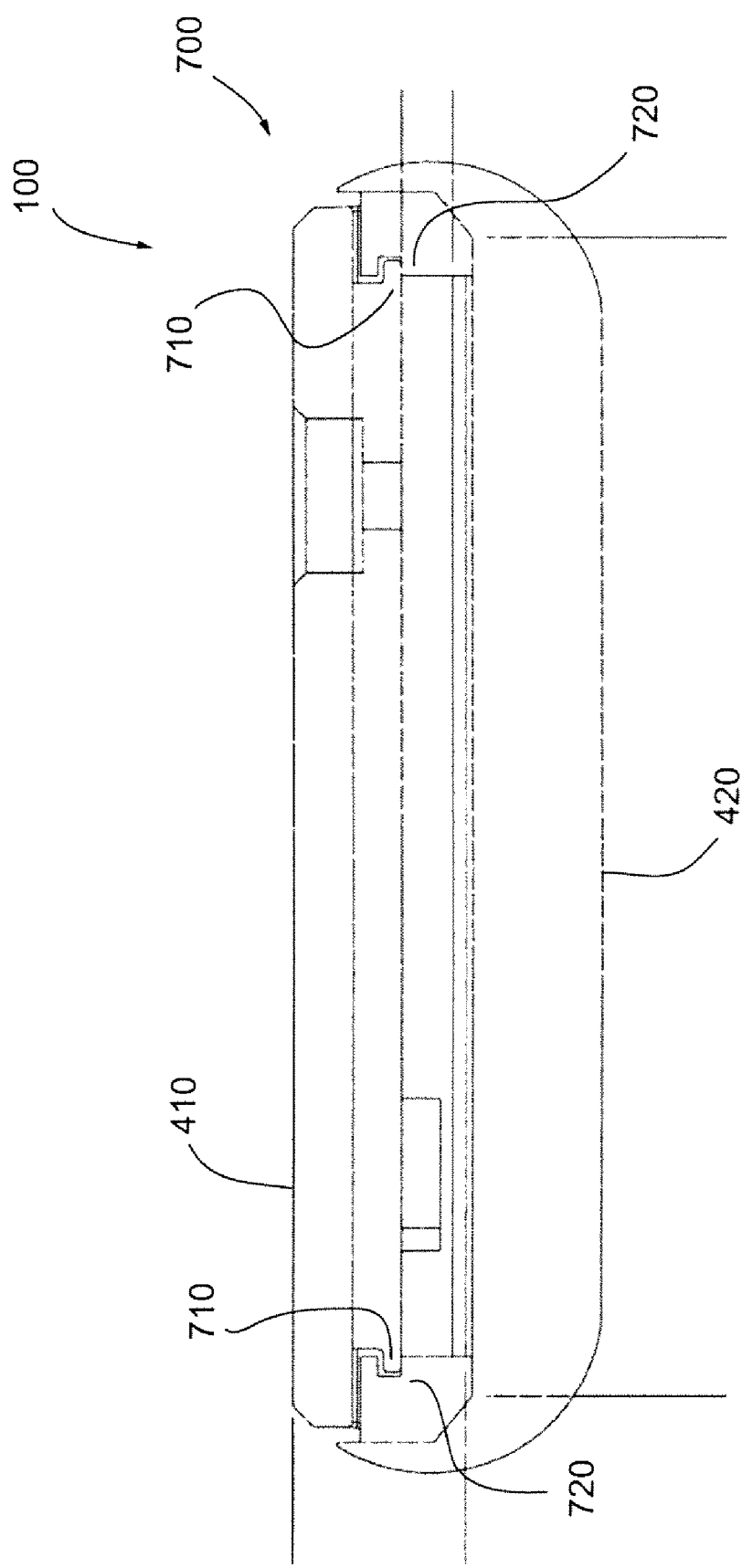
FIG. 7 shows a schematic diagram of another embodiment of a sliding mechanism 700 for a mobile device 100.

FIG. 7 shows a schematic diagram of another embodiment of a sliding mechanism 700 for a mobile device 100. In this embodiment, the first portion 410 of the mobile device 100 is provided with engagement portions 710 which engage with rail portions 720 provided to the second portion 420 of the mobile device 100. This allows the first portion 410 to slide relative to the second portion 420 while remaining engaged with the second portion 420.

Figure 8:
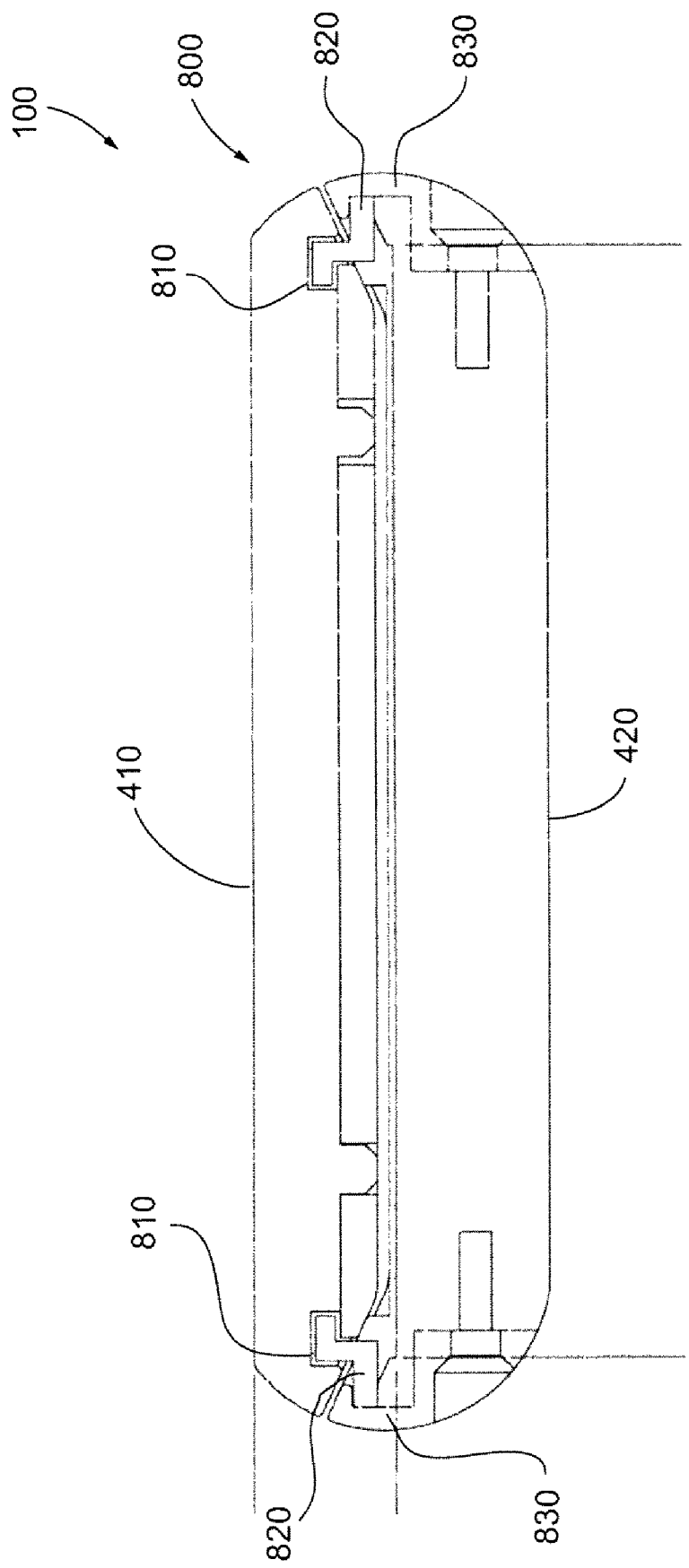
FIG. 8 is a schematic diagram of another embodiment of a sliding mechanism 800 for a mobile device 100.

FIG. 8 is a schematic diagram of another embodiment of a sliding mechanism 800 for a mobile device 100. In this embodiment, the first portion 410 is configured with an upper slot 810 for engaging with and an engagement system 820 such that the first portion 410 is supported by the engagement system 820. The second portion 420 is also configured with a lower slot 830 to engage with the engagement system 820. Thus, this embodiment is intended to incorporate the support of the bridge embodiment and the engagement of the rail embodiment.

As well as having a slider mechanism for the first portion 410 over the second portion 420, the multi-mode user input system 400 is also provided with a locking/detent mechanism to allow the first portion 410 to be held at the first mode position and, in some embodiments, also at the closed and second mode position.

Figure 9A:
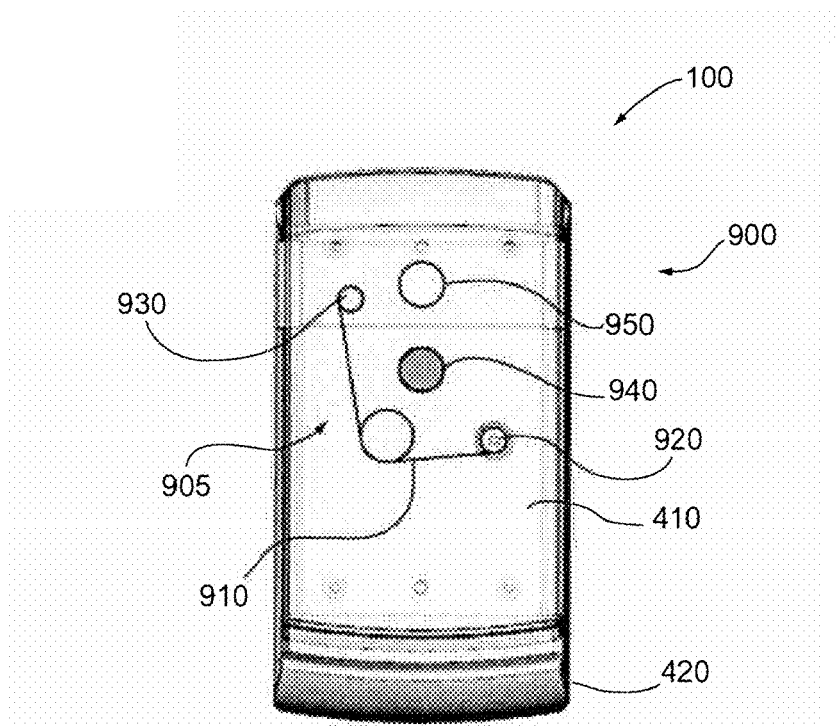
FIG. 9A to 9C illustrate an example embodiment of a locking/detent mechanism 900.
Figure 9B:
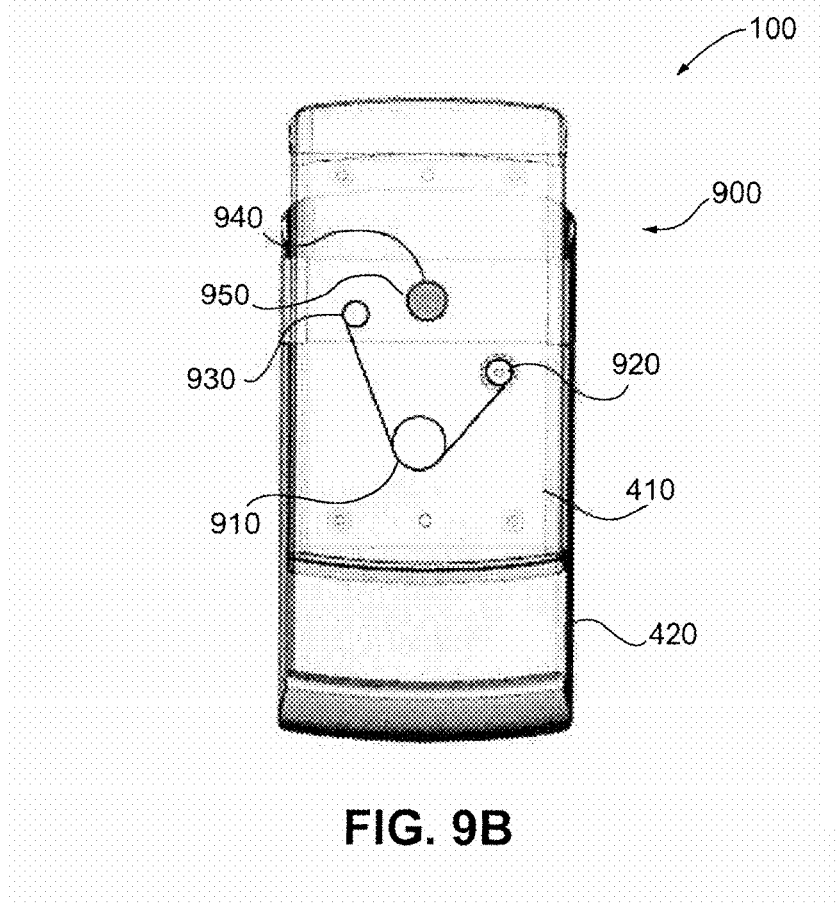
Figure 9C:
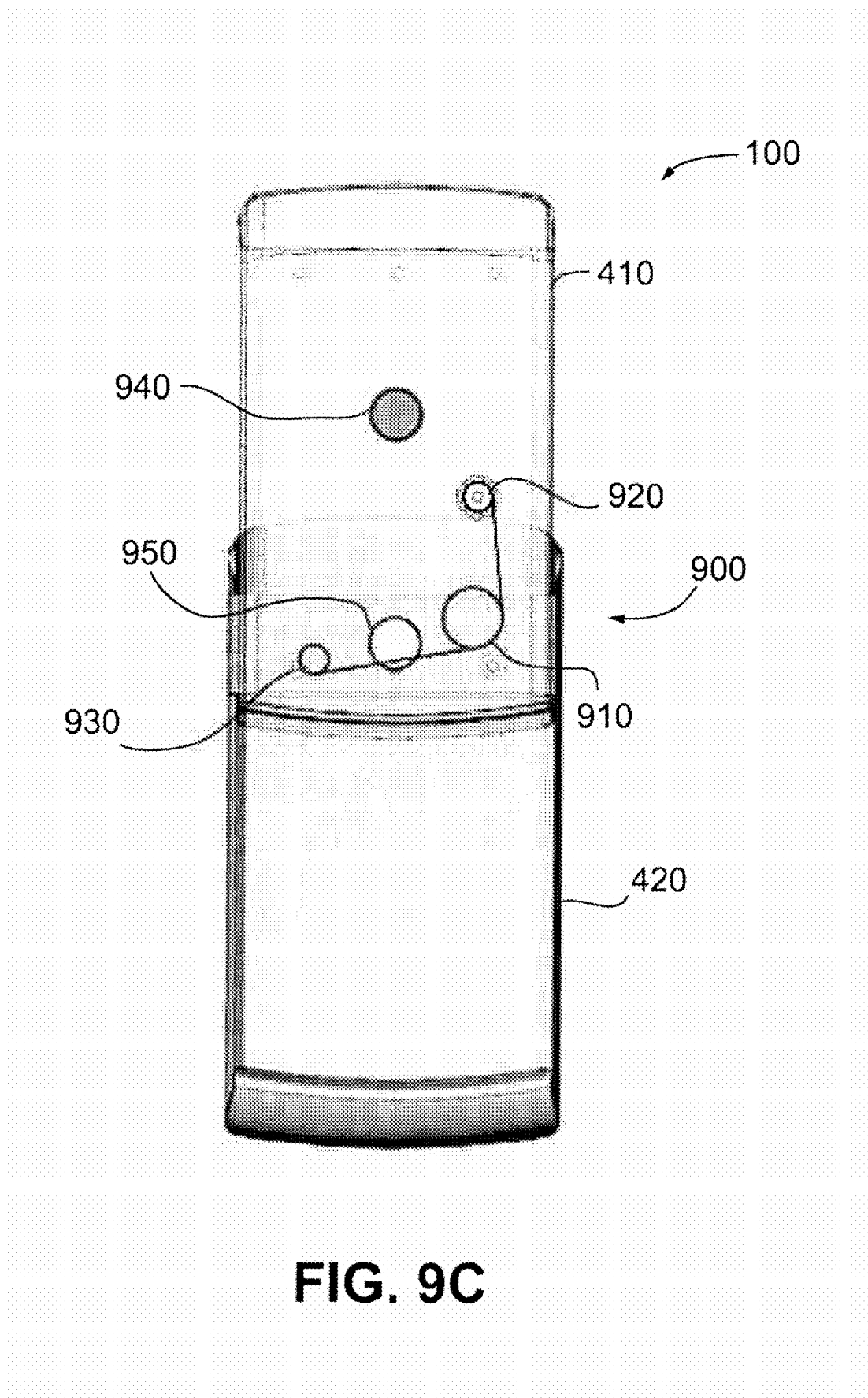

FIG. 9A to 9C illustrate an example embodiment of a locking/detent mechanism 900. A spring system 905 includes a spring 910 that is connected to an upper attachment 920 on the first portion 410 and to a lower attachment 930 on the second portion 420 of the mobile device 100. An upper magnet 940 is provided on the first portion 410 and a lower magnet 950 is provided on the second portion 420 of the mobile device 100. FIG. 9A shows the mobile device 100 in a closed position. The spring system 905 is configured such that the first portion 410 will be stable in the open or closed position relative to the second portion 420. As force is applied from the closed position, the first portion 410 will move to the first mode position as shown in FIG. 9B and providing access to the first user input area 430 of FIG. 4B. In this first mode position, the upper magnet 940 and lower magnet 950 are positioned/engaged to provide an intermediate lock/detent mechanism of the first portion 410 relative to the second portion 420. The centering force of the magnets 940 and 950 overcomes any force to close or open the first portion 410 due to the spring system 905 so that the first portion 410 stays stable at that first mode position. With a further application of force, the user can move the first portion 410 out of the first mode position and the spring system 905 drives the first portion 410 to either the open or closed position based on the direction that the user applies the force.

Figure 10A:
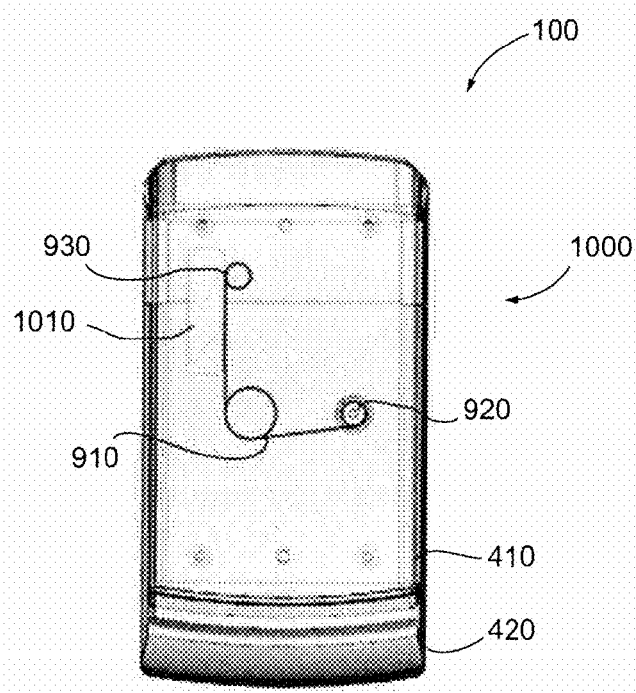
FIG. 10A to 10C illustrate another embodiment of a locking/detent mechanism 1000.
Figure 10B:
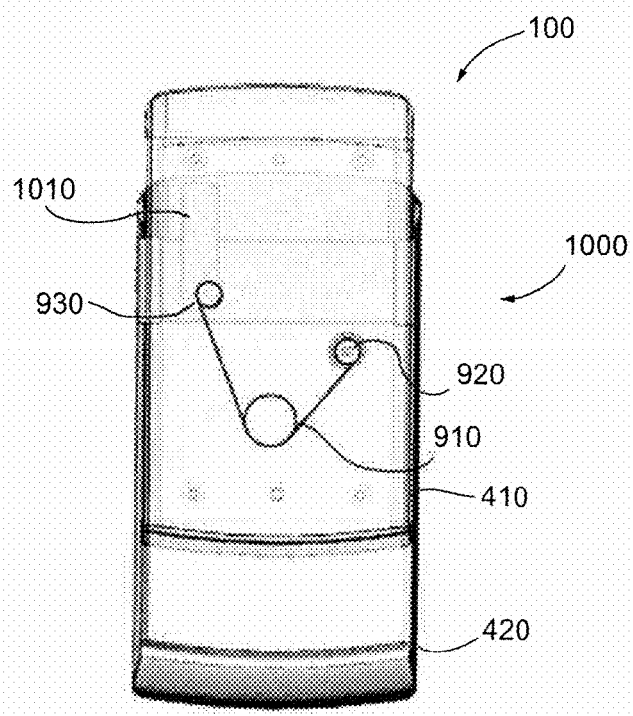
Figure 10C:
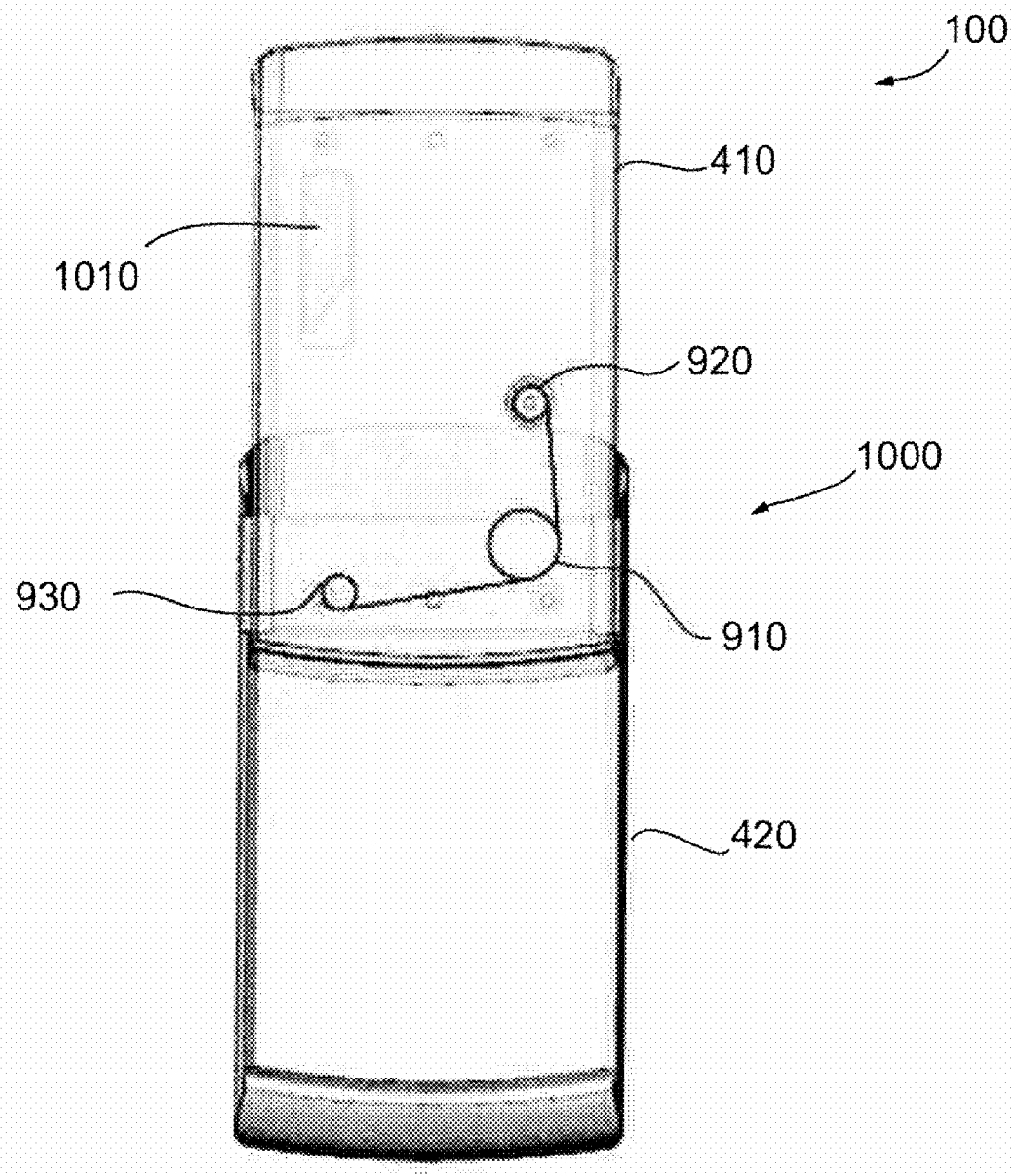

FIG. 10A to 10C illustrate another embodiment of a locking/detent mechanism 1000. This embodiment is similar to the embodiment shown in FIG. 9A to 9C, however, rather than using magnets 940/950 to lock/detent the first portion 410 relative to the second portion 420 at the first mode position, the first portion 410 is provided with a cam 1010 that engages with the lower attachment 930 of the spring 910 to compress the spring 910 at the first mode position and lock/detent the movement of the first portion 410 as shown in FIG. 10B. Similar to the locking/detent mechanism of FIG. 9A to 9C, the locking/detent mechanism 1000 uses an over-centering spring 910, but in this case the cam 1010 and moving lower attachment 930 are used to create the stable position in the first mode position. In the first mode position, the spring 910 is compressed (in torsion it wants to spread out to a larger angle) but the spring 910 is positioned against the cam 1010 where the angle holds the spring 910 stable and doesn't drive the first portion 410 closed. If the first portion 410 is pushed further open, the spring 910 operates like the spring of FIG. 9A to 9C, while if the first portion 410 is pushed closed the user must provide the extra force to climb the cam 1010 and then the spring 910 can drive the first portion 410 closed over the flat portion of the profile of the cam 1010.

Figure 11A:
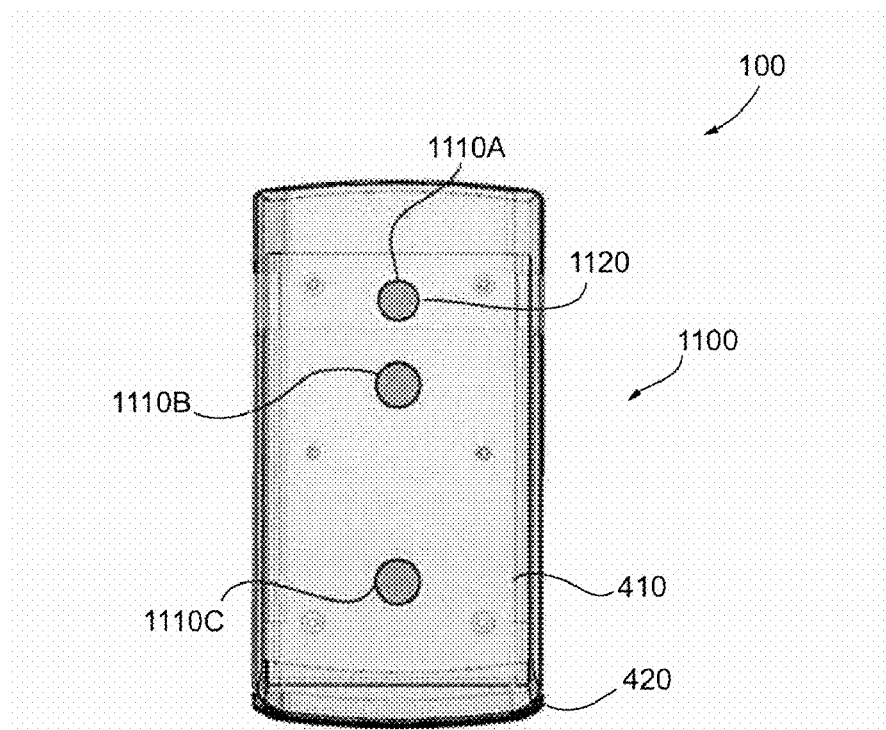
FIG. 11A to 11C illustrate another embodiment of a locking/detent mechanism 1100 that makes use of magnets for each of the mode positions.
Figure 11B:
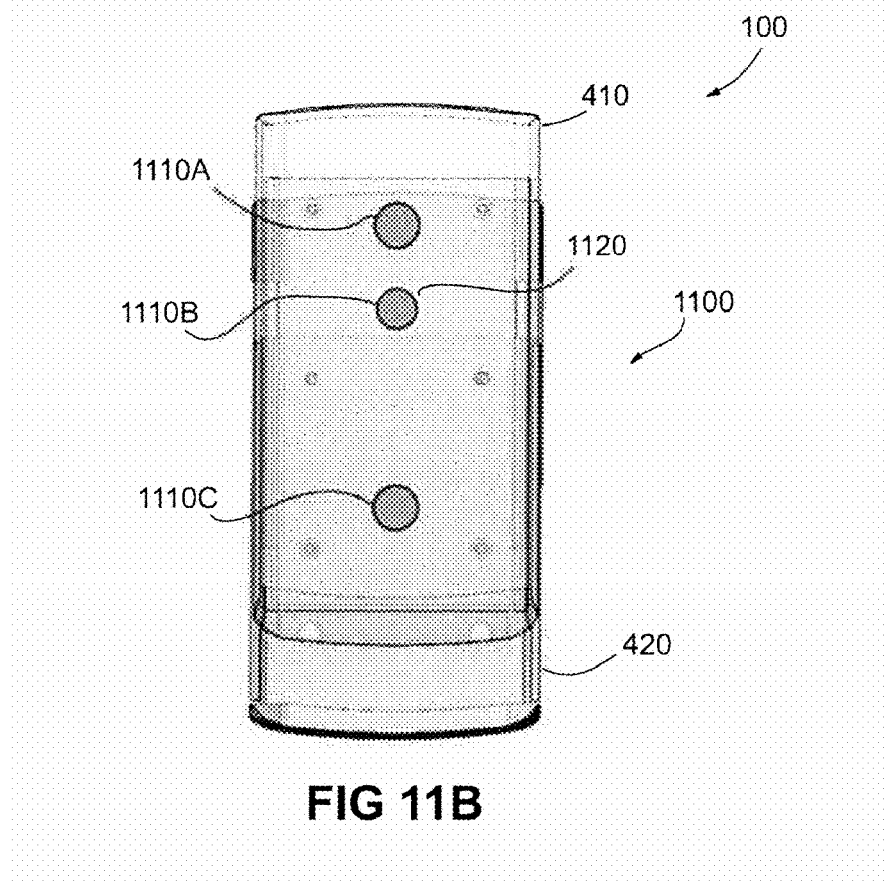
Figure 11C:
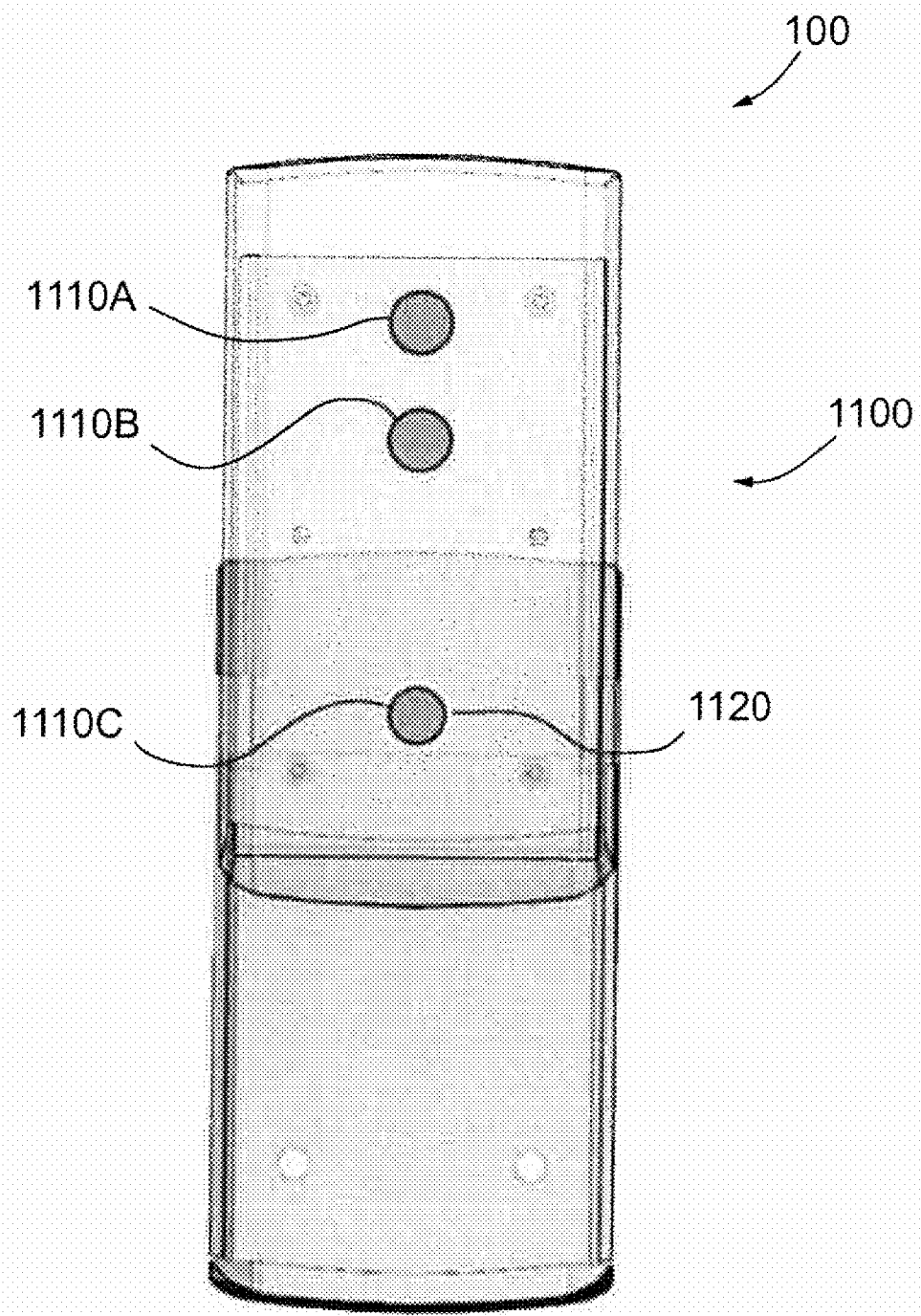

FIG. 11A to 11C illustrate another embodiment of a locking/detent mechanism 1100 that makes use of magnets for each of the mode positions. In this embodiment, the first portion 410 of the mobile device 100 includes three upper magnets 1110A to 1110C while the second portion 420 includes a lower magnet 1120. In FIG. 11A, the mobile device 100 is in a closed position and the first upper magnet 1110A is engaged with the lower magnet 1120. In FIG. 11B, the second upper magnet 1110B is engaged with the lower magnet 1120 and the first portion 410 is held in position relative to the second portion 420 at the first mode position. In FIG. 11C, the third upper magnet 1110C has been moved to engage with the lower magnet 1120 and, thus, hold the first portion 410 in the fully open position relative to the second portion 420.

The use of magnets 1110/1120 as a locking/detent mechanism may pose some problems with regard to the amount of force needed to engage and disengage the magnets as they move over top of each other. In some cases, it may be useful for the lower magnet and upper magnet to have an unequal strength of magnetic field. In other embodiments it may be appropriate to use a steel fitting in place of an appropriate one or more of the magnets (for example, the lower magnet that will engage with the upper magnet). Other embodiments may involve the use of magnets with a steel surround, magnets with a steel covering, magnets with a broken steel cover or the like.

It will be further understood that the spring system 905 used to provide a force driving the first portion and second portion open or closed may take other formats than that illustrated. For example, the spring system 905 may alternatively be a spring-loaded piston-type arrangement that is connected between fixed pivot points.

It will be understood that other embodiments will be apparent to those skilled in the art based on the disclosure of the above embodiments. For example, it will be apparent that the present disclosure is not intended to be limited to only a dual mode user input mechanism, but could be expanded to three mode, four mode or more depending on the needs of the particular mobile device.

It should be understood that various other modifications can be made to the exemplary embodiments described and illustrated herein, without departing from the general scope of the appended claims. In particular, it should be understood that while the embodiments have been described for mobile communication devices, the embodiments are generally applicable to devices requiring user input in one or more modes.

We claim:

1. A system for multi-mode user input for a mobile device comprising:
   first portion of the mobile device;
   a second portion of the mobile device that is movably engaged with the first portion to allow the first portion to move between a closed position and an open position to allow access to an open user input area; and a detent mechanism configured to allow the first portion to be held at a first mode position between the closed position and the open position to allow access to a partial user input area that is less than the open user input area wherein the detent mechanism comprises:
- a lower magnetically active element provided to the second portion;
- an upper magnetically active element provided to the first portion that is configured to align with the lower magnetically active element when the first portion is at the first mode position; and
- a second upper magnetically active element provided to the first portion that is configured to align with the lower magnetically active element when the first portion is at the closed position.

2. A system according to claim 1, wherein the first portion is movably engaged with the second portion in a slidable manner.

3. A system according to claim 1, wherein the lower magnetically active element is a steel plate.

4. A system according to claim 1, wherein the upper and lower magnetically active elements are magnets, each having a different polarity.

5. A system according to claim 4, wherein the upper magnet and lower magnet have a different magnetic strength.

6. A system according to claim 4, wherein at least one of the magnets comprise a magnet having a steel surround.

7. A system according to claim 4, wherein at least one of the magnets comprise a magnet having a steel cover.

8. A system according to claim 1, further comprising:
- a third upper magnetically active element provided to the first portion that is configured to align with the lower magnetically active element when the first portion is at the open position.

9. A system according to claim 1, wherein the detent mechanism comprises:
- a cam provided to the second portion; and
- a movable pivot provided to the first portion that is configured to engage with the cam such that the first portion is held with a predetermined force when the first portion is at the first mode position.

10. A system according to claim 2, wherein the first portion is slidably engaged with the second portion by a sliding mechanism comprising:
- a rail provided in the second portion; and
- a bridge element provided between the second portion and the first portion that supports the first portion and is engaged with the rail to allow sliding movement of the bridge element along the rail.

11. A system according to claim 2, wherein the first portion is slidably engaged with the second portion by a sliding mechanism comprising:
- a rail provided in the second portion; and
- an engagement element provided to the first portion that engages with the rail to allow sliding movement of the first portion along the rail.

12. A system according to claim 1, wherein the partial user input area provides media play/record functions.

13. A system according to claim 1, wherein the open user input area provides keyboard functions.

14. A method for multi-mode user input for a mobile device comprising:
- when the mobile device is in a closed position, applying a force to a first portion of the mobile device in relation to a second portion of the mobile device to open the mobile device;
- providing a detent mechanism configured to allow the first portion to be held at a first mode position in which a first user input area is available wherein the detent mechanism comprises:
  - a lower magnetically active element provided to the second portion;
  - an upper magnetically active element provided to the first portion that is configured to align with the lower magnetically active element when the first portion is at the first mode position; and
  - a second upper magnetically active element provided to the first portion that is configured to align with the lower magnetically active element when the first portion is at the closed position; and
- from the first mode position, applying a further force to move the first portion to a second mode position in which a second user input area is available without moving through the closed position.

15. A method according to claim 14, further comprising changing the function of the first user input area when moving to the second mode position.

16. A method according to claim 15, wherein the changing the function of the first user input area comprises changing a function of at least one input control within the first user input area.

17. A method for multi-mode user input for a mobile device comprising:
- providing a mobile device having a first portion and a second portion, wherein the first portion is movably engaged with the second portion to move between a closed position and an open position to allow access to an open user input area; and
- providing a detent mechanism configured to allow the first portion to be held at an intermediate position between the closed position and the open position to allow access to a partial user input area that is less than the open user input area wherein the detent mechanism comprises:
  - a lower magnetically active element provided to the second portion;
  - an upper magnetically active element provided to the first portion that is configured to align with the lower magnetically active element when the first portion is at the intermediate position; and
  - a second upper magnetically active element provided to the first portion that is configured to align with the lower magnetically active element when the first portion is at the closed position.

18. A method according to claim 17, further comprising changing the function of the partial user input area when moving between the intermediate mode position and the open position.

* * * * *